Aug. 12, 1958
F. G. MULLER
2,847,181
BUTTERFLY VALVE
Filed Sept. 16, 1955
2 Sheets-Sheet 2
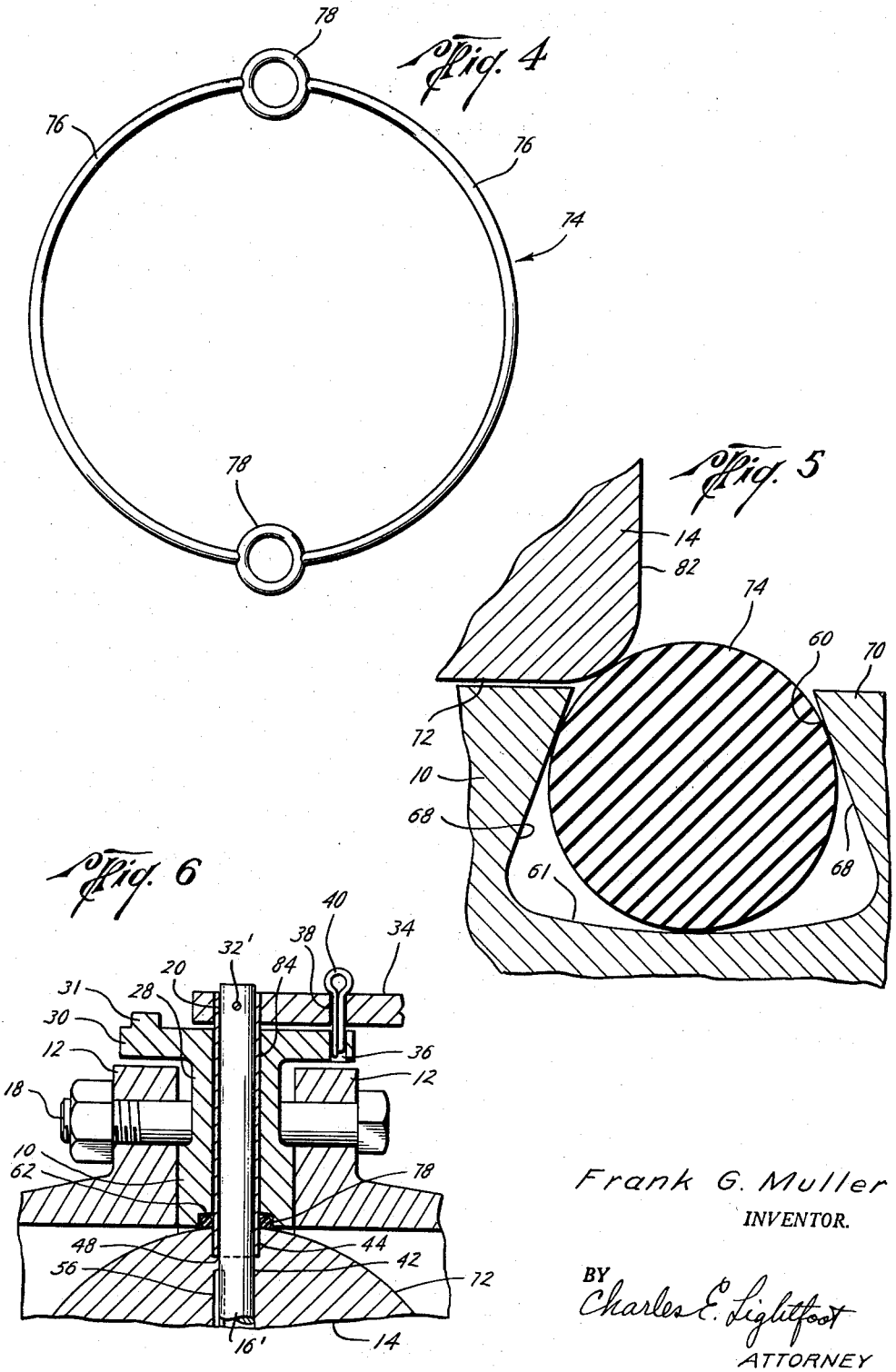
Frank G. Muller
INVENTOR.
BY Charles E. Lightfoot
ATTORNEY

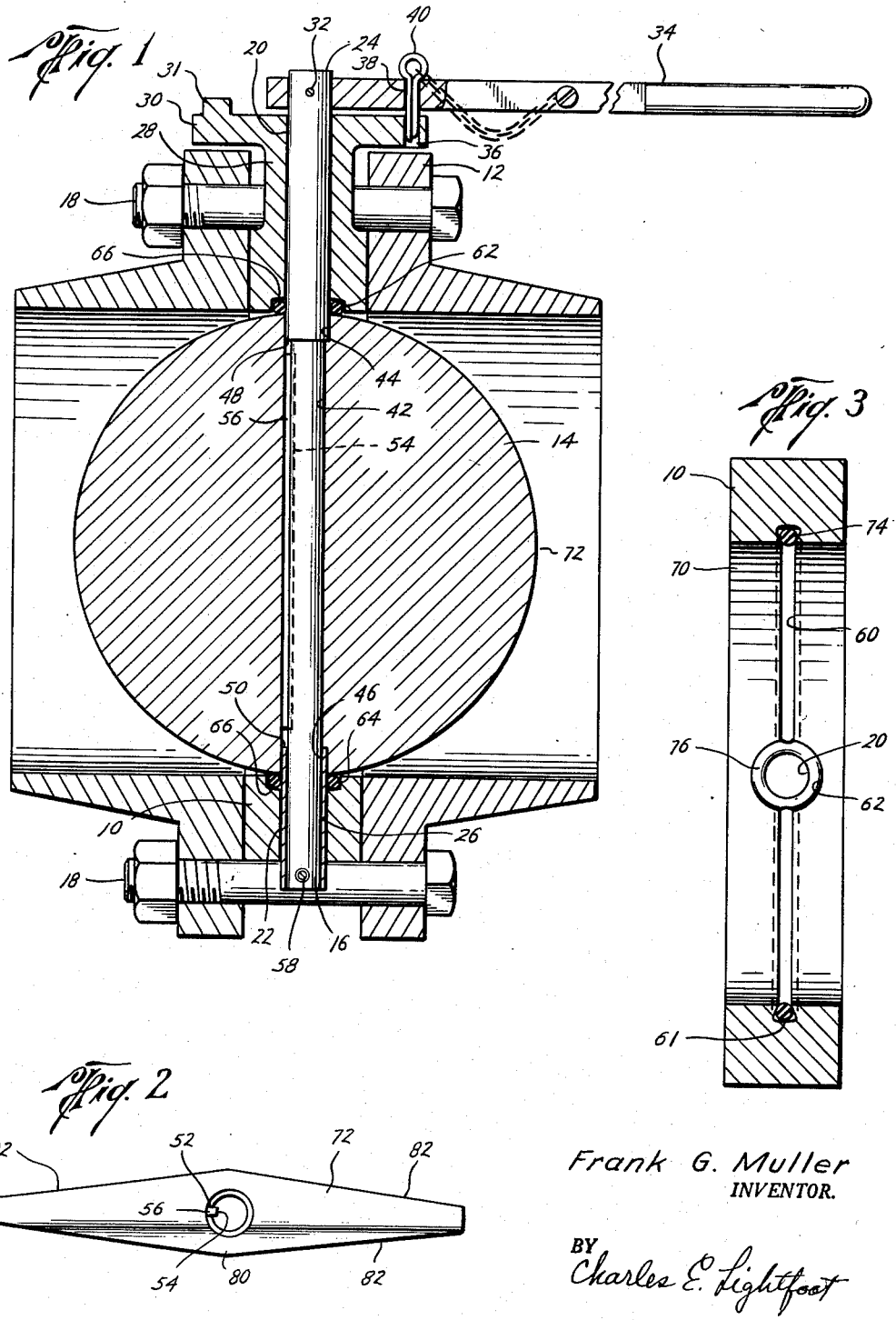

United States Patent Office 2,847,181
Patented Aug. 12, 1958

2,847,181

BUTTERFLY VALVE

Frank G. Muller, La Porte, Tex.

Application September 16, 1955, Serial No. 534,751

2 Claims. (Cl. 251—306)

This invention relates to a butterfly valve, and more particularly to a butterfly valve assembly constructed to permit opening and closing of the valve by rotation of the same in either direction, having improved fluid flow characteristics, which is easily assembled and disassembled, and which embodies improved seal forming means.

The invention has for an important object the provision of a valve of the butterfly type which is constructed to offer a minimum of resistance to fluid flow when in open position but which operates on closing to completely shut off the flow of fluid.

Another object of the invention is to provide a valve of the butterfly type, having a valve casing and a valve disk which is mounted on a rotatable shaft extending into the casing, and embodying sealing means forming a leak proof seal between the shaft and casing in all positions of the valve.

A further object of the invention is the provision of a butterfly valve having a valve disk shaped to form with the valve casing a venturi-like passageway when the valve is in open position, whereby the resistance to fluid flow through the valve is substantially reduced.

Another object of the invention is to provide a butterfly valve having a casing and valve disk construction designed to permit 360 degree movement of the valve disk, whereby the valve may be opened or closed by rotation of the disk in either direction.

A further object of the invention is the provision of a valve of the butterfly type which is constructed for relatively high pressure use, and which is reversible to permit the same to be applied to a flow line without regard to the direction of the flow of fluid therethrough.

Another object of the invention is to provide a butterfly valve assembly having a valve casing and disk structure which is of simple design and rugged construction, involving few parts and which is easily and quickly assembled and disassembled for purposes of repair and replacement.

The above and other important objects and advantages of the invention will best be understood from the following detailed description constituting a specification of the same when considered in conjunction with the annexed drawings wherein—

Figure 1 is a longitudinal, central, cross-sectional view of a preferred embodiment of the invention showing details of structure of the same with the parts in assembled condition;

Figure 2 is an end view of the valve disk of the butterfly valve removed from the assembly;

Figure 3 is a transverse, central cross-sectional view of the valve casing taken at right angles to the view of Figure 1 with the valve disk removed therefrom;

Figure 4 is a detail view of the improved sealing element of the butterfly valve removed from the assembly and shown as molded.

Figure 5 is a fragmentary, cross-sectional view, on a greatly enlarged scale, similar to that of Figure 3, but with the valve disk mounted in the assembly, showing details of structure of the valve casing, seal forming element and valve disk and illustrating the relationship of those parts in the operation of the valve; and Figure 6 is a fragmentary view similar to that of Figure 1, illustrating a modification of the invention.

Referring now to the drawings in greater detail the invention, briefly stated, comprises a valve casing or housing 10, of generally annular configuration, which is adapted to be clamped between end flanges 12, 12 of conventional construction, such as those used in connecting together lengths of pipe to form a flow line, and within which housing a valve disk 14 is keyed to a shaft 16, whose opposite ends are rotatably supported, so that the disk may be rotated with the shaft to open or closed position.

The end flanges 12, 12 are secured together in clamping relation to the housing in any convenient manner, as by means of bolts 18.

The housing 10 is provided with diametrically opposite openings 20 and 22, through which the shaft 16 extends, the shaft having an enlarged end portion 24 at one end, which extends through the opening 20, and the bushing 26 being provided at the other end of the shaft extending through the opening 22, the housing also being formed with an extension 28, provided with an external flange 30 at its outer end through which the enlarged end portion 24 is extended. The shaft 16 is extended outwardly beyond the external flange 30 and is connected at its outer end to an operating lever 34 by a pin 32 which extends through aligned openings in the shaft and lever whereby the shaft may be rotated. Suitable means, such as one or more openings 36 in the flange 30, may be provided, which are positioned for registration with an opening 38 in the lever 34, to permit the insertion of a pin 40, whereby the valve disk may be held in any desired position in the housing.

The valve disk 14 has a centrally located diametrical bore 42, which opens at its opposite ends into counterbores 44 and 46, providing outwardly facing shoulders 48 and 50, positioned for engagement with the inner end of the enlargement 24 and the inner end of the bushing 26, respectively. Within the bore 42 a longitudinal internal keyway 52 is provided in the bore of the disk, and the shaft 16 has a similar external keyway 54, into which keyways a key 56 is fitted, to cause the disk to rotate with the shaft.

The assembly described is one of many forms whereby the valve disk 14 may be secured to the shaft. A polygonal, splined, or serrated shaft may be used instead of a keyed shaft. Suitable means, such as a pin 58, may be inserted through registering openings in the bushing 26 and shaft 16, to retain these three parts in their respective places in the assembly.

The housing 10 has an internal groove 60 extending circumferentially between the openings 20 and 22 of the housing, and ending into annular internal recessed portions 62 and 64, surrounding the openings 20 and 22, respectively, these annular recessed portions having bottom walls 66, which are spherical in shape. The side walls 68 of the internal circumferentially extending groove 60 converge inwardly, as best seen in Figure 5, so that the opening of the groove is of substantially less width than of the bottom portion thereof. The bottom wall 61 of groove 60 is also spherical in shape and runs out into the spherical bottom walls 66 of recessed portions 62 and 64. All of the bottom walls are part of the same sphere. The housing 10 is also formed with an inner cylindrical face 70, through which the groove 60 opens.

As shown in Figure 5, the cross-sectional area of the groove 60 is somewhat larger than the cross-sectional area of the seal forming element 74 while the cross-sectional diameter of the seal forming element is greater than the depth of the groove, so that due to the inwardly converging arrangement of the side walls 68 of the groove some space will be left between the seal forming element and the portions of the groove in the regions where the side walls and bottom wall merge to permit the seal forming element to be readily forced into the groove into sealing contact with the housing 10 and disk 14 when the valve is closed.

The disk 14 is formed with an external circumferential spherical surface 72, which is positioned to lie in opposed relation to the spherical bottom wall 61 of groove 60, when the valve is in closed position. Portions of the spherical surface of the valve are also positioned in opposed relation to the spherical bottom surface 66 of the recesses 62 and 64. In all positions of the valve, the spherical surface of the valve and the spherical bottom surfaces of the grooved portions 62 and 64 are positioned in concentric relationship.

Within the groove 60 and the recesses 62 and 64 of the housing a seal forming element 74 is disposed, which is substantially in the form of three O-rings joined together, made of resilient material such as rubber, or the like, having circumferentially extending portions 76 adapted to be positioned in the groove 60, and annular portions 78, connecting the portions 76, and which are arranged to be positioned in the annular recesses 62 and 64 of the housing. The portions 76 and 78 are of the same cross-sectional diameter but somewhat greater than the depth of the groove 60 and recesses 62 and 64, so that the seal forming element will be in sealing contact with the valve disk 14 and housing 10 about the openings 20 and 22, in all positions of the valve, while the portions 76 of the seal forming element will be in sealing contact with the valve disk and the housing to form a seal entirely about the circumference of the valve disk when the valve is in closed position. Parts 78 are turned 90 degrees from the position shown in Figure 4 when the sealing medium is inserted in the housing 10.

The valve disk has a thickened central portion 80, through which the bore 42 extends, and the flat faces 82 of the disk slope outwardly from this central portion toward the circumference of the disk in planes parallel to the axis of the shaft 16, to provide portions tapering oppositely away from the central portion so that the disk forms with the housing Venturi-like passageways on each side of the disk, when the valve is in fully opened position. Due to this shaping of the valve to form the Venturi-like passageways when the valve is in fully opened position, resistance to the flow of fluid is substantially less than would be encountered in the use of a valve of different configuration.

In Figure 6 there is illustrated a somewhat modified form of the invention, wherein the shaft 16' is of uniform diameter throughout its length, and a bushing 84 is provided, surrounding the shaft in the location where the shaft passes through the opening 20 in the extension 28 of the housing and extending outwardly beyond the external flange 30. The bushing 84 is in engagement at its inner end with the internal shoulder 48 of the bore 42. In this manner a shaft of uniform diameter throughout its length may be employed instead of the shaft 16, having the externally enlarged end portion 24. In this construction the pin 32' extends through bushing 84 and the operating lever 34.

In other respects this form of the invention is constructed and operated in the same manner as that described in connection with the form illustrated in Figure 1.

In the operation of the invention the valve disk may be rotated 360 degrees by means of the handle 34, and may thus be opened or closed by rotation in either direction in the housing. The rotation of the valve may be reduced to 90 degrees by restricting the movement of the lever 34 by suitable stops one of which is indicated at 31 mounted on external flange 30. The object of this method would be to establish definite opening and closing positions of the valve. When the valve is moved to its closed position, the external peripheral spherical surface of the disk engages the seal forming element 74, which projects somewhat from the groove 60 to form a fluid tight seal between the disk and the housing, the seal forming element being forced inwardly of the groove during closing movement of the valve. It will also be apparent that the portions 78 of the seal forming element are at all times compressed between the spherical surface of the disk and the spherical bottom surfaces of the recesses 62 and 64, whereby a fluid tight seal is maintained about the shaft of the valve in all positions of the valve.

It will thus be seen that the invention, constructed and operated as described above, provides a valve of the butterfly type, which is of simple design and rugged construction, wherein the flowway is substantially unobstructed when the valve is in open position, and in which the valve is sealed against the flow of fluid therethrough in either direction when the valve is closed.

The invention has been disclosed herein in connection with certain specific embodiments of the same, but it will be understood that this is by way of example only and that numerous changes may be made in the construction and arrangement of the various parts, without departing from the spirit of the invention or the scope of the appended claims.

Having thus clearly shown and described the invention, what is claimed as new and desired to secure by Letters Patent is—

1. A butterfly valve assembly comprising a casing having a cylindrical flowway therethrough, a disk-shaped valve having a peripheral surface of spherical shape, means for supporting the valve in the casing for rotation therein with said spherical surface disposed in radially inwardly spaced, concentric relation to the internal surface of the flowway to permit the valve to be rotated, said casing having an internal groove positioned to lie opposite said spherical surface when the valve is closed and whose bottom wall is spherical and concentrically disposed relative to said spherical surface and whose side walls converge inwardly and seal forming means of substantially circular shape in cross section disposed in said groove in position for sealing engagement with the valve and casing when the valve is closed and whose cross-sectional diameter is greater than the depth of said groove and whose cross-sectional area is less than the cross-sectional area of said groove to provide space between the seal forming means and housing in the groove into which the seal forming means may extend when the valve is closed.

2. A butterfly valve assembly comprising a casing having a cylindrical flowway therethrough, a disk-shaped valve having a peripheral surface of spherical shape, means for supporting the valve in the casing for rotation therein with said spherical surface disposed in radially inwardly spaced, concentric relation to the internal surface of the flowway to permit the valve to be rotated, said casing having an internal groove positioned to lie opposite said spherical surface when the valve is closed and whose side walls converge inwardly and whose bottom wall is spherical and disposed in concentric relation to said spherical surface, and seal forming means of substantially circular shape in cross section disposed in said groove in position for sealing engagement with the valve and casing when the valve is closed and whose cross-sectional diameter is greater than the depth of the groove and the distance between said side walls at the inner extremities of the side walls and whose cross-sectional area is less than the cross-sectional area of the groove to provide space between the seal forming means and housing in the groove in the regions where the side walls and bottom wall merge into which the seal forming means may extend when the valve is closed.

References Cited in the file of this patent

UNITED STATES PATENTS

| | | |
|---|---|---|
| 1,824,168 | Orton | Sept. 22, 1931 |
| 2,081,842 | Sharp | May 25, 1937 |
| 2,385,510 | Harwood | Sept. 25, 1945 |
| 2,657,896 | Muller | Nov. 3, 1953 |
| 2,704,650 | Rand | Mar. 22, 1955 |